US011047606B2

(12) United States Patent
Krishnamoorthy et al.

(10) Patent No.: US 11,047,606 B2
(45) Date of Patent: Jun. 29, 2021

(54) SYSTEMS AND METHODS FOR CONDENSER DIAGNOSTICS

(71) Applicant: Hill Phoenix, Inc., Conyers, GA (US)

(72) Inventors: Naresh Kumar Krishnamoorthy, Kerala (IN); Pedro Jesus Greiner, Conyers, GA (US)

(73) Assignee: Hill Phoenix, Inc., Conyers, GA (US)

( * ) Notice: Subject to any disclaimer, the term of this patent is extended or adjusted under 35 U.S.C. 154(b) by 0 days.

(21) Appl. No.: 16/587,642

(22) Filed: Sep. 30, 2019

(65) Prior Publication Data
US 2021/0095907 A1    Apr. 1, 2021

(51) Int. Cl.
*F25B 49/02* (2006.01)
*F25B 9/00* (2006.01)
*F24F 11/32* (2018.01)

(52) U.S. Cl.
CPC ............ *F25B 49/027* (2013.01); *F24F 11/32* (2018.01); *F25B 9/008* (2013.01); *F25B 2600/19* (2013.01); *F25B 2700/15* (2013.01); *F25B 2700/21163* (2013.01)

(58) Field of Classification Search
CPC . F24F 11/32; F24F 11/38; F25B 9/008; F25B 2600/19; F25B 2700/15; F25B 2700/21163
See application file for complete search history.

(56) References Cited

U.S. PATENT DOCUMENTS

| 9,168,315 B1* | 10/2015 | Scaringe | F25B 49/02 |
| 2009/0071175 A1* | 3/2009 | Pham | F25B 49/005 62/129 |
| 2009/0133419 A1* | 5/2009 | Matsuno | F25B 49/025 62/239 |
| 2011/0146313 A1* | 6/2011 | Finckh | F25B 9/008 62/186 |

* cited by examiner

*Primary Examiner* — Jonathan Bradford
(74) *Attorney, Agent, or Firm* — Fish & Richardson P.C.

(57) ABSTRACT

A CO2 refrigeration system can include a condenser, multiple fans, and a controller. The condenser can be configured to cool CO2 and the multiple fans can be configured to affect cooling operations of the condenser. The controller may be configured to obtain a temperature value of CO2 output by the condenser. The controller may be configured to determine if the condenser is operating properly using the temperature value of the CO2. The controller may be configured to obtain values of input current and input voltage provided to the multiple fans. The controller can determine a number of in-operational or faulty fans of the multiple fans using, at least in part, the values of the input current and the input voltage and a model that relates input current to input voltage for known numbers of in-operational or faulty fans.

20 Claims, 7 Drawing Sheets

SYSTEMS AND METHODS FOR CONDENSER DIAGNOSTICS

BACKGROUND

The present invention relates generally to the field of refrigeration systems with condensers. More particularly, the present invention relates to condenser diagnostics. Condensers may condense a refrigerant such as carbon dioxide and output the carbon dioxide at a desired or setpoint temperature. However, when condensers fail it can be difficult to determine if the failure is due to an electronic problem (e.g., fan failure) or for mechanical reasons (e.g., with the condenser).

SUMMARY

One implementation of the present disclosure is a CO2 refrigeration system, according to some embodiments. The CO2 refrigeration system includes a condenser, multiple fans, and a controller, according to some embodiments. The condenser can be configured to cool CO2. The multiple fans can be configured to affect cooling operations of the condenser. The controller may be configured to obtain a temperature value of CO2 output by the condenser. The controller may be configured to determine if the condenser is operating properly using the temperature value of the CO2. The controller may be configured to obtain values of input current and input voltage provided to the multiple fans. The controller can determine a number of in-operational or faulty fans of the multiple fans using, at least in part, the values of the input current and the input voltage and a model that relates input current to input voltage for known numbers of in-operational or faulty fans.

In some embodiments, the controller is configured to compare the temperature value of the CO2 to an expected value. The controller may be configured to determine that the condenser is operating properly in response to the temperature value of the CO2 being substantially equal to the expected value. The controller may be configured to determine that the condenser is not operating properly in response to the temperature value of the CO2 deviating from the expected value by at least a threshold amount.

In some embodiments, the model is multiple sixth order polynomial curves. In some embodiments, a first one of the curves defines input current with respect to input voltage when all of the multiple fans are operating properly. In some embodiments, one or more of the curves define input current with respect to input voltage when one or more of the multiple fans are not operating properly.

In some embodiments, the controller is configured to determine a first value of the input current using the value of the input voltage and the model. In some embodiments, the first value is a predicted value of the input current when all of the multiple fans are operating properly. In some embodiments, the controller is configured to determine a first range of values of the input current using the first value and a tolerance value. In some embodiments, the controller is configured to determine that all of the fans are operating properly in response to the input current being within the first range of values. In some embodiments, the controller is configured to determine that one or more of the multiple fans are not operating properly in response to the input current being outside of the first range of values.

In some embodiments, the controller is configured to determine one or more other values of the input current using the value of the input voltage and the model. In some embodiments, the other values of the input current each correspond to a different number of the multiple fans operating properly. In some embodiments, the controller is configured to determine one or more other ranges of values of the input current using the one or more other values of the input current and a tolerance value. In some embodiments, the controller is configured to determine a number of fans that are in-operational or faulty based on which of the other ranges of values the input current is within.

In some embodiments, the controller is configured to generate control signals for the fans to drive the temperature value of CO2 output by the condenser towards a setpoint temperature.

In some embodiments, the controller is configured to determine that the condenser has failed mechanically in response to determining that the condenser is not operating properly and determining that none of the multiple fans are in-operational or faulty.

In some embodiments, the controller is configured to operate a user interface to notify a user regarding at least one of an operational status of the condenser, an operational status of the multiple fans, or the number of in-operational or faulty fans.

Another implementation of the present disclosure is a controller for operating and diagnosing a condenser, according to some embodiments. In some embodiments, the controller is configured to obtain an outlet temperature value of fluid output by the condenser. The controller may be configured to compare the outlet temperature value of fluid to an expected outlet temperature value to determine an operational status of the condenser. The controller may be configured to obtain an input current value and an input voltage value of electrical energy provided to multiple fans of the condenser. The controller can be configured to estimate a first range of current values using the input voltage provided to the multiple fans of the condenser. In some embodiments, the input current value being within the first range of current values indicates that all of the multiple fans are operating properly. In some embodiments, the controller is configured to determine that one or more of the multiple fans are in-operational or faulty in response to the input current value being outside of the first range of current values. In some embodiments, the controller is configured to notify a user regarding the operational status of the condenser and a number of in-operational or faulty fans.

In some embodiments, the controller is configured to determine that the condenser is operating properly in response to the outlet temperature value being substantially equal to the expected outlet temperature. In some embodiments, the controller is configured to determine that the condenser is not operating properly in response to the outlet temperature value deviating from the expected outlet temperature by at least a threshold amount.

In some embodiments, the controller is configured to estimate the first range of current values using the input voltage and a model of the condenser.

In some embodiments, the model of the condenser defines a relationship between input current and input voltage for a case when all of the multiple fans are operational, and other cases when one or more of the multiple fans are in-operational or faulty.

In some embodiments, the controller is configured to predict a first value of the input current using the model for the case when all of the fans are operational. In some embodiments, the controller is configured to determine a first range of values of the input current using the first value and a tolerance value. In some embodiments, the controller is configured to predict other values of the input current using the model for cases when different numbers of the fans are in-operational or faulty. In some embodiments, the controller is configured to determine multiple ranges of values of the input current for cases when different numbers of the fans are in-operational or faulty. In some embodiments, the controller is configured to compare the input current value to the first range of values and each of the other ranges of values of the input current to determine a number of the fans that are in-operational or faulty.

In some embodiments, the controller is configured to generate control signals for the fans to drive the outlet temperature value of fluid towards a setpoint value.

In some embodiments, the controller is configured to determine that the condenser is mechanically in-operational in response to determining that the condenser is not operating properly, and determining that none of the fans are in-operational or faulty.

In some embodiments, the controller is configured to operate a user interface to notify a user regarding at least one of the operational status of the condenser, an operational status of the fans, or the number of in-operational or faulty fans.

Another implementation of the present disclosure is a method for controlling and diagnosing a condenser, according to some embodiments. The method can include operating multiple condenser fans to drive an outlet fluid temperature of the condenser towards a setpoint value, and obtaining a value of the outlet fluid temperature of the condenser. The method can include determining if the condenser is operating properly based on the value of the outlet fluid temperature of the condenser and the setpoint value. The method can also include obtaining values of input current and input voltage provided to the condenser fans. The method can also include determining a number of in-operational or faulty condenser fans, at least in part, the values of the input current and the input voltage and a model that relates input current to input voltage for known numbers of in-operational or faulty condenser fans.

In some embodiments, determining if the condenser is operating properly includes comparing the outlet fluid temperature of the condenser to the setpoint value, and determining that the condenser is operating properly in response to the outlet fluid temperature of the condenser being substantially equal to the setpoint value. In some embodiments, the method includes determining that the condenser is not operating properly in response to the outlet fluid temperature of the condenser deviating from the setpoint value by at least a threshold amount.

In some embodiments, determining the number of in-operational or faulty condenser fans includes determining a first value of the input current using the value of the input voltage and the model. In some embodiments, the first value is a predicted value of the input current when all of the condenser fans are operating properly. In some embodiments, the method includes determining a first range of values of the input current using the first value and a tolerance value. In some embodiments, the method includes determining that all of the condenser fans are operating properly in response to the input current being within the first range of values. In some embodiments, the method includes determining that one or more of the condenser fans are not operating properly in response to the input current being outside of the first range of value.

In some embodiments, the method further includes determining one or more other values of the input current using the value of the input voltage and the model. In some embodiments, the other values of the input current each correspond to a different number of the condenser fans operating properly. In some embodiments, the method includes determining one or more other ranges of values of the input current using the one or more other values of the input current and a tolerance value, and determining a number of fans that are in-operational or faulty based on which of the other ranges of values the input current is within

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, a refrigeration system shown as a CO2 refrigeration system includes a condenser, condenser fans, and a diagnostics/control system. The diagnostics/control system includes a controller that is configured to receive or measure input current and/or input voltage to the condenser fans in addition to outlet temperature of the CO2. The controller can compare the outlet temperature to an expected outlet temperature to determine if the condenser is operating properly (e.g., to determine whether or not the CO2 is being sufficiently cooled). The controller can be configured to compare the measured input current to a non-faulty range, and various faulty ranges. If the measured current is within the non-faulty range, the controller may determine that the fans are operating properly. If the controller determines that the fans are operating properly but that the condenser is not operating properly (e.g., that the outlet temperature is not the expected outlet temperature), the controller may determine that the condenser has failed mechanically (e.g., due to blockage).

The controller can also determine or identify or detect a number of failed condenser fans. For example, if the input current is within a first faulty range, the controller can identify that one of the condenser fans have failed. If the input current is within a second faulty range, the controller can identify that two of the condenser fans have failed. The controller can use a model, various mathematical equations, various curves, etc., that model the input current and the input voltage of the condenser fans. The controller can use these predetermined or predefined models to identify or detect a number of condenser fans that have failed or are in-operational.

Condenser System

Figure 1:
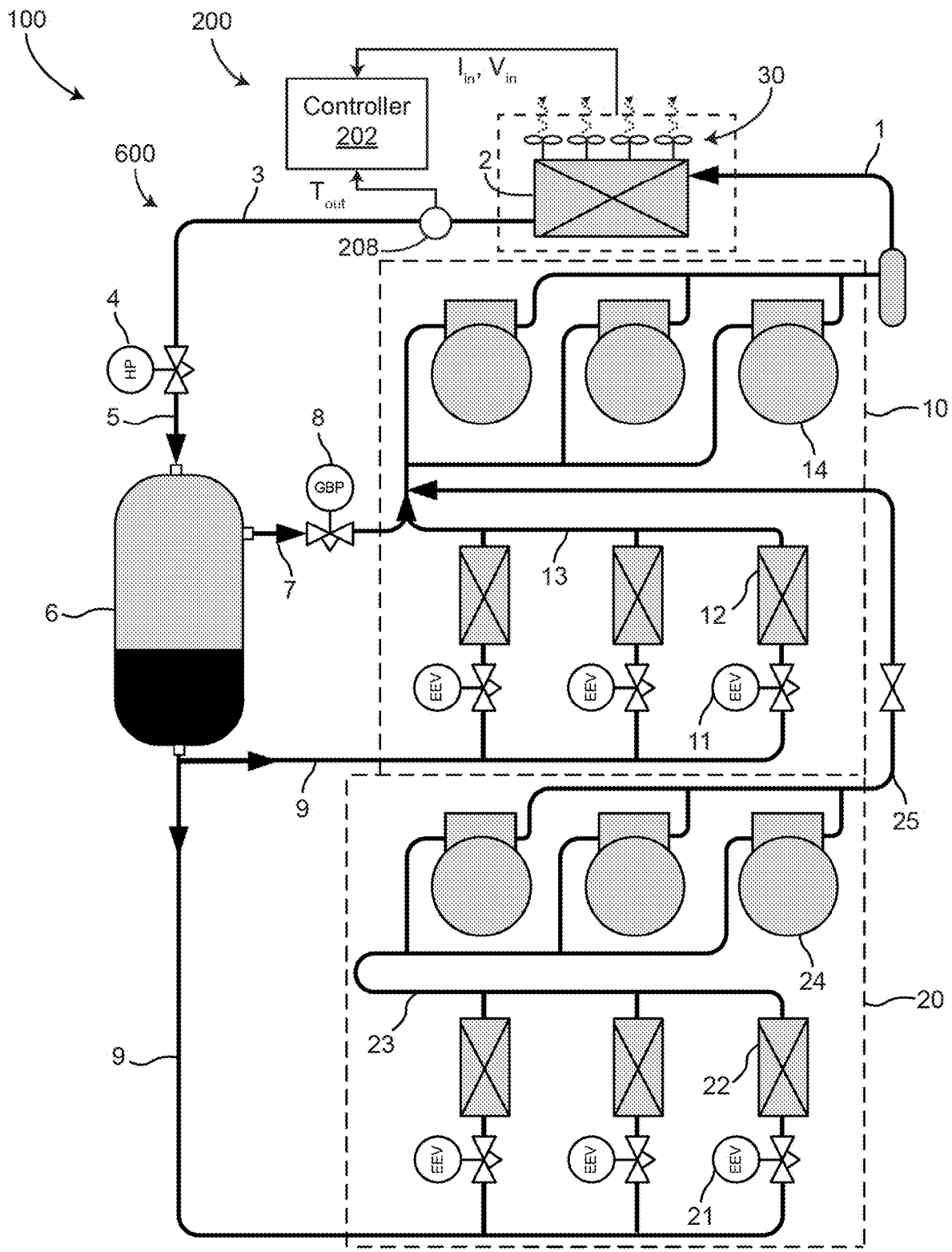
FIG. 1 is a schematic diagram of a CO2 refrigeration system, according to some embodiments.

Referring more particularly to FIG. 1, a CO2 refrigeration system 100 is shown according to an exemplary embodiment. CO2 refrigeration system 100 may be a vapor compression refrigeration system which uses primarily carbon dioxide as a refrigerant. CO2 refrigeration system 100 and is shown to include a system of pipes, conduits, or other fluid channels (e.g., fluid conduits 1, 3, 5, 7, and 9) for transporting the carbon dioxide between various thermodynamic components the refrigeration system. The thermodynamic components of CO2 refrigeration system 100 are shown to include a gas cooler/condenser 2, a high pressure valve 4, a receiving tank 6, a gas bypass valve 8, a medium-temperature ("MT") system portion 10, and a low-temperature ("LT") system portion 20.

Gas cooler/condenser 2 may be a heat exchanger or other similar device for removing heat from the CO2 refrigerant. Gas cooler/condenser 2 is shown receiving CO2 vapor from fluid conduit 1. In some embodiments, the CO2 vapor in fluid conduit 1 may have a pressure within a range from approximately 45 bar to approximately 100 bar (i.e., about 640 psig to about 1420 psig), depending on ambient temperature and other operating conditions. In some embodiments, gas cooler/condenser 2 may partially or fully condense CO2 vapor into liquid CO2 (e.g., if system operation is in a subcritical region). The condensation process may result in fully saturated CO2 liquid or a liquid-vapor mixture (e.g., having a thermodynamic quality between 0 and 1). In other embodiments, gas cooler/condenser 2 may cool the CO2 vapor (e.g., by removing superheat) without condensing the CO2 vapor into CO2 liquid (e.g., if system operation is in a supercritical region). In some embodiments, the cooling/condensation process is an isobaric process. Gas cooler/condenser 2 is shown outputting the cooled and/or condensed CO2 refrigerant into fluid conduit 3.

High pressure valve 4 receives the cooled and/or condensed CO2 refrigerant from fluid conduit 3 and outputs the CO2 refrigerant to fluid conduit 5. High pressure valve 4 may control the pressure of the CO2 refrigerant in gas cooler/condenser 2 by controlling an amount of CO2 refrigerant permitted to pass through high pressure valve 4. In some embodiments, high pressure valve 4 is a high pressure thermal expansion valve (e.g., if the pressure in fluid conduit 3 is greater than the pressure in fluid conduit 5). In such embodiments, high pressure valve 4 may allow the CO2 refrigerant to expand to a lower pressure state. The expansion process may be an isenthalpic and/or adiabatic expansion process, resulting in a flash evaporation of the high pressure CO2 refrigerant to a lower pressure, lower temperature state. The expansion process may produce a liquid/vapor mixture (e.g., having a thermodynamic quality between 0 and 1). In some embodiments, the CO2 refrigerant expands to a pressure of approximately 38 bar (e.g., about 540 psig), which corresponds to a temperature of approximately 37° F. The CO2 refrigerant then flows from fluid conduit 5 into receiving tank 6.

Receiving tank 6 collects the CO2 refrigerant from fluid conduit 5. In some embodiments, receiving tank 6 may be a flash tank or other fluid reservoir. Receiving tank 6 includes a CO2 liquid portion and a CO2 vapor portion and may contain a partially saturated mixture of CO2 liquid and CO2 vapor. In some embodiments, receiving tank 6 separates the CO2 liquid from the CO2 vapor. The CO2 liquid may exit receiving tank 6 through fluid conduits 9. Fluid conduits 9 may be liquid headers leading to either MT system portion 10 or LT system portion 20. The CO2 vapor may exit receiving tank 6 through fluid conduit 7. Fluid conduit 7 is shown leading the CO2 vapor to gas bypass valve 8.

Gas bypass valve 8 is shown receiving the CO2 vapor from fluid conduit 7 and outputting the CO2 refrigerant to MT system portion 10. In some embodiments, gas bypass valve 8 regulates or controls the pressure within receiving tank 6 by controlling an amount of CO2 refrigerant permitted to pass through gas bypass valve 8 (e.g., by regulating a position of gas bypass valve 8). Gas bypass valve 8 may open and close as needed to regulate the pressure within receiving tank 6. In some embodiments, gas bypass valve 8 may be a thermal expansion valve (e.g., if the pressure on the downstream side of gas bypass valve 8 is lower than the pressure in fluid conduit 7). According to one embodiment, the pressure within receiving tank 6 is regulated by gas bypass valve 8 to a pressure of approximately 38 bar, which corresponds to about 37° F. Advantageously, this pressure/temperature state (i.e., approximately 38 bar, approximately 37° F.) may facilitate the use of copper tubing/piping for the downstream CO2 lines of the system. Additionally, this pressure/temperature state may allow such copper tubing to operate in a substantially frost-free manner.

Still referring to FIG. 1, MT system portion 10 is shown to include one or more expansion valves 11, one or more MT evaporators 12, and one or more MT compressors 14. In various embodiments, any number of expansion valves 11, MT evaporators 12, and MT compressors 14 may be present. Expansion valves 11 may be electronic expansion valves or other similar expansion valves. Expansion valves 11 are shown receiving liquid CO2 refrigerant from fluid conduit 9 and outputting the CO2 refrigerant to MT evaporators 12. Expansion valves 11 may cause the CO2 refrigerant to undergo a rapid drop in pressure, thereby expanding the CO2 refrigerant to a lower pressure, lower temperature state. In some embodiments, expansion valves 11 may expand the CO2 refrigerant to a pressure of approximately 30 bar. The expansion process may be an isenthalpic and/or adiabatic expansion process.

MT evaporators 12 are shown receiving the cooled and expanded CO2 refrigerant from expansion valves 11. In some embodiments, MT evaporators may be associated with display cases/devices (e.g., if CO2 refrigeration system 100 is implemented in a supermarket setting). MT evaporators 12 may be configured to facilitate the transfer of heat from the display cases/devices into the CO2 refrigerant. The added heat may cause the CO2 refrigerant to evaporate partially or completely. According to one embodiment, the CO2 refrigerant is fully evaporated in MT evaporators 12. In some embodiments, the evaporation process may be an isobaric process. MT evaporators 12 are shown outputting the CO2 refrigerant via fluid conduits 13, leading to MT compressors 14.

MT compressors 14 compress the CO2 refrigerant into a superheated vapor having a pressure within a range of approximately 45 bar to approximately 100 bar. The output pressure from MT compressors 14 may vary depending on ambient temperature and other operating conditions. In some embodiments, MT compressors 14 operate in a transcritical mode. In operation, the CO2 discharge gas exits MT compressors 14 and flows through fluid conduit 1 into gas cooler/condenser 2.

Still referring to FIG. 1, LT system portion 20 is shown to include one or more expansion valves 21, one or more LT evaporators 22, and one or more LT compressors 24. In various embodiments, any number of expansion valves 21, LT evaporators 22, and LT compressors 24 may be present. In some embodiments, LT system portion 20 may be omitted and the CO2 refrigeration system 100 may operate with an AC module interfacing with only MT system 10.

Expansion valves 21 may be electronic expansion valves or other similar expansion valves. Expansion valves 21 are shown receiving liquid CO2 refrigerant from fluid conduit 9 and outputting the CO2 refrigerant to LT evaporators 22. Expansion valves 21 may cause the CO2 refrigerant to undergo a rapid drop in pressure, thereby expanding the CO2 refrigerant to a lower pressure, lower temperature state. The expansion process may be an isenthalpic and/or adiabatic expansion process. In some embodiments, expansion valves 21 may expand the CO2 refrigerant to a lower pressure than expansion valves 11, thereby resulting in a lower temperature CO2 refrigerant. Accordingly, LT system portion 20 may be used in conjunction with a freezer system or other lower temperature display cases.

LT evaporators 22 are shown receiving the cooled and expanded CO2 refrigerant from expansion valves 21. In some embodiments, LT evaporators may be associated with display cases/devices (e.g., if CO2 refrigeration system 100 is implemented in a supermarket setting). LT evaporators 22 may be configured to facilitate the transfer of heat from the display cases/devices into the CO2 refrigerant. The added heat may cause the CO2 refrigerant to evaporate partially or completely. In some embodiments, the evaporation process may be an isobaric process. LT evaporators 22 are shown outputting the CO2 refrigerant via fluid conduit 23, leading to LT compressors 24.

LT compressors 24 compress the CO2 refrigerant. In some embodiments, LT compressors 24 may compress the CO2 refrigerant to a pressure of approximately 30 bar (e.g., about 425 psig) having a saturation temperature of approximately 23° F. (e.g., about −5° C.). LT compressors 24 are shown outputting the CO2 refrigerant through fluid conduit 25. Fluid conduit 25 may be fluidly connected with the suction (e.g., upstream) side of MT compressors 14.

In some embodiments, the CO2 vapor that is bypassed through gas bypass valve 8 is mixed with the CO2 refrigerant gas exiting MT evaporators 12 (e.g., via fluid conduit 13). The bypassed CO2 vapor may also mix with the discharge CO2 refrigerant gas exiting LT compressors 24 (e.g., via fluid conduit 25). The combined CO2 refrigerant gas may be provided to the suction side of MT compressors 14.

Control and Diagnostics System

Referring still to FIG. 1, CO2 refrigeration system 100 can include a control and diagnostics system 200 that is configured to operate CO2 refrigeration system 100. Control and diagnostics system 200 can also be configured to monitor outlet temperatures $T_{out}$ of condenser 2, input current $I_{in}$ and input voltage $V_{in}$ of condenser 2. Control and diagnostics system 200 can detect failure of condenser 2 and determine if the failure is due to mechanical reasons or if the failure is due to electronic reasons (e.g., fan failure).

Control and diagnostics system 200 includes a controller 202 that is configured to receive the input current $I_{in}$ and the input voltage $V_{in}$ from condenser 2. Controller 202 can also be configured to receive the outlet temperature $T_{out}$ from a temperature sensor 208. Temperature sensor 208 is configured to measure, monitor, detect, etc., the outlet temperature $T_{out}$ of CO2 that is output by condenser 2. Controller 202 may also generate control signals for condenser 2 and provide the control signals to condenser 2 to operate condenser 2. In some embodiments, controller 202 is or includes a feedback controller and is configured to operate condenser 2 to achieve a desired outlet temperature $T_{sp}$. For example, controller 202 can use the outlet temperature $T_{out}$ received from temperature sensor 208 as feedback and operate condenser 2 to drive the outlet temperature $T_{out}$ towards the desired or setpoint temperature $T_{sp}$. Controller 202 can also operate condenser 2 to drive the outlet temperature $T_{out}$ towards a temperature value that is associated with a desired amount of cooling. Temperature sensor 208 can be configured to measure the cooled and/or condensed CO2 in fluid conduit 3.

Referring still to FIG. 1, condenser 2 includes fans 30 that are configured to facilitate condensation or cooling of the CO2 vapor in fluid conduit 1. Fans 30 can draw a current and a voltage to operate. Fans 30 may operate to force a convective heat transfer at condenser 2, thereby driving the cooling of the CO2 vapor that passes through condenser 2. Condenser 2 can include any number of fans 30. For example, condenser 2 can include four fans, six fans, eight fans, etc. Controller 202 can be configured to generate control signals for fans 30 and operate fans 30 to achieve a desired cooling of the CO2 vapor and thereby achieve the setpoint or desired temperature of the cooled and/or condensed CO2 liquid in fluid conduit 3. In some embodiments, fans 30 are powered by 12 volt DC or AC electric motors.

Controller 202 can monitor the temperature $T_{out}$ of the cooled and/or condensed CO2 in fluid conduit 3 to determine if condenser 2 is operating properly. For example, if the temperature $T_{out}$ of the cooled and/or condensed CO2 in fluid conduit 3 is substantially equal to the setpoint or desired temperature $T_{sp}$, controller 202 can determine that condenser 2 is operating properly.

Figure 2:
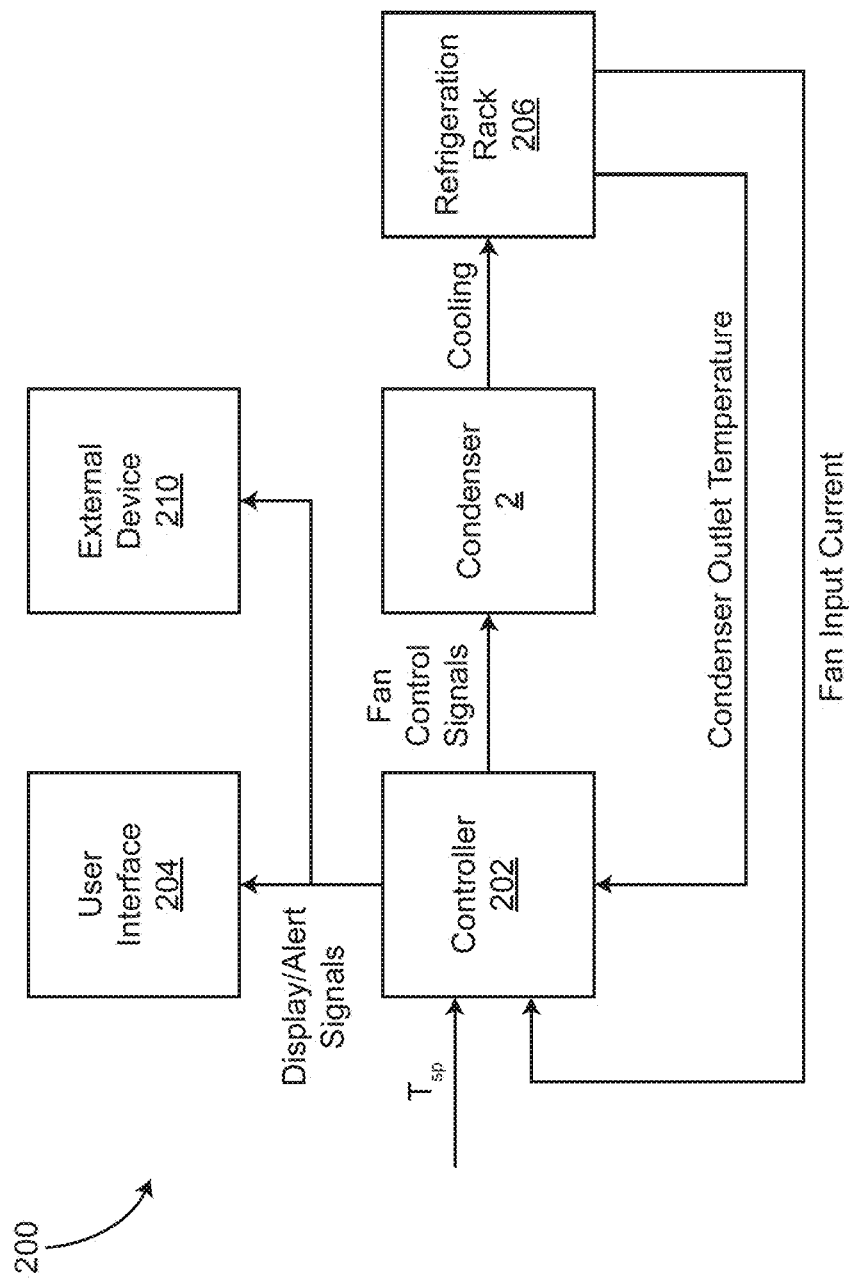
FIG. 2 is a block diagram of a diagnostics and control system of the CO2 refrigeration system of FIG. 1, according to some embodiments.

Referring particularly to FIG. 2, control and diagnostics system 200 includes controller 202, condenser 2, refrigeration rack 206, and user interface 204. Controller 202 is configured to receive the setpoint temperature $T_{sp}$ and use the setpoint temperature $T_{sp}$ to operate condenser 2. Controller 202 can generate fan control signals for fans 30 so that fans 30 operate to cool or condense the CO2 vapor provided to condenser 2 through fluid conduit 1. Controller 202 can operate fans 30 to achieve the setpoint or desired temperature $T_{sp}$ of cooled and/or condensed CO2 in fluid conduit 3 (e.g., the temperature of CO2 output by condenser 2).

Controller 202 may receive the setpoint temperature $T_{sp}$ from user interface 204. In other embodiments, the setpoint temperature $T_{sp}$ is pre-programmed into controller 202. Controller 202 may perform a diagnostics test, a diagnostics function, a diagnostics process, etc., to determine if condenser 2 has faulted. In some embodiments, controller 202 determines if condenser 2 is operating properly by comparing the setpoint temperature $T_{sp}$ to the temperature $T_{out}$ of the cooled and/or condensed CO2 in fluid conduit 3. If the temperature $T_{out}$ of the cooled and/or condensed CO2 in fluid conduit 3 deviates from the setpoint or desired temperature $T_{sp}$ by some amount (e.g., a predetermined amount), controller 202 may determine that condenser 2 is not operating properly. Controller 202 can use any of the processes, methods, approaches, techniques, functionality, etc., described herein to determine if condenser 2 is not operating properly due to mechanical failure(s) and/or due to electrical failure(s).

Controller 202 may generate display and/or alert signals for user interface 204 to notify a user or a technician regarding an operational status (e.g., a fault status) of condenser 2. Controller 202 can operate user interface 204 to notify the technician or the user whether condenser 2 has failed or not, as well as a reason for failure of condenser 2. For example, controller 202 may operate user interface 204 to notify the technician regarding whether condenser 2 has experienced a mechanical failure, an electrical failure, etc. In some embodiments, controller 202 operates user interface 204 to notify the technician and/or the user that a certain number of fans 30 have failed. For example, controller 202 can operate user interface 204 to notify the user or the technician that one of fans 30 has failed, two of fans 30 have failed, etc. In this way, controller 202 and user interface 204 advantageously facilitate notifying the technician regarding the failure mode of condenser 2, as well as providing troubleshooting information (e.g., what number of fans 30 have failed). Providing the failure mode of condenser 2 and the troubleshooting information may improve the technician's ability to determine the cause of failure of condenser 2 and may reduce servicing time by providing the technician with the mode or cause of failure of condenser 2.

Referring still to FIG. 2, control and diagnostics system 200 can include an external device 210, according to some embodiments. In some embodiments, controller 202 is configured to notify external device 210 regarding failure of condenser 2 and/or a failure mode of condenser 2. Controller 202 can also provide external device 210 with troubleshooting information. External device 210 and controller 202 can be configured to wirelessly and/or wiredly communicate with each other. In some embodiments, external device 210 is any of a personal computer device, a remote server, a remotely positioned device, a cell phone, a computer, etc. Controller 202 can provide external device 210 with alert signals, failure status of condenser 2 (e.g., operational status), failure mode of condenser 2 (e.g., mechanical failure versus electrical failure) and troubleshooting information (e.g., how many fans 30 of condenser 2 have failed).

Condenser 2 can receive the fan control signals from controller 202 and operate fans 30 using the fan control signals. As described in greater detail above with reference to FIG. 1, condenser 2 can provide cooling to refrigeration rack 206. It should be understood that the term "refrigeration rack" as described herein can refer to the various components, devices, containers, etc., of CO2 refrigeration system 100 that are served by (e.g., receive cooling from) CO2 refrigeration system 100, or more specifically, the components, devices, containers, etc., of CO2 refrigeration system 100 that are served by condenser 2.

Condenser Fan Curves

Figure 3:
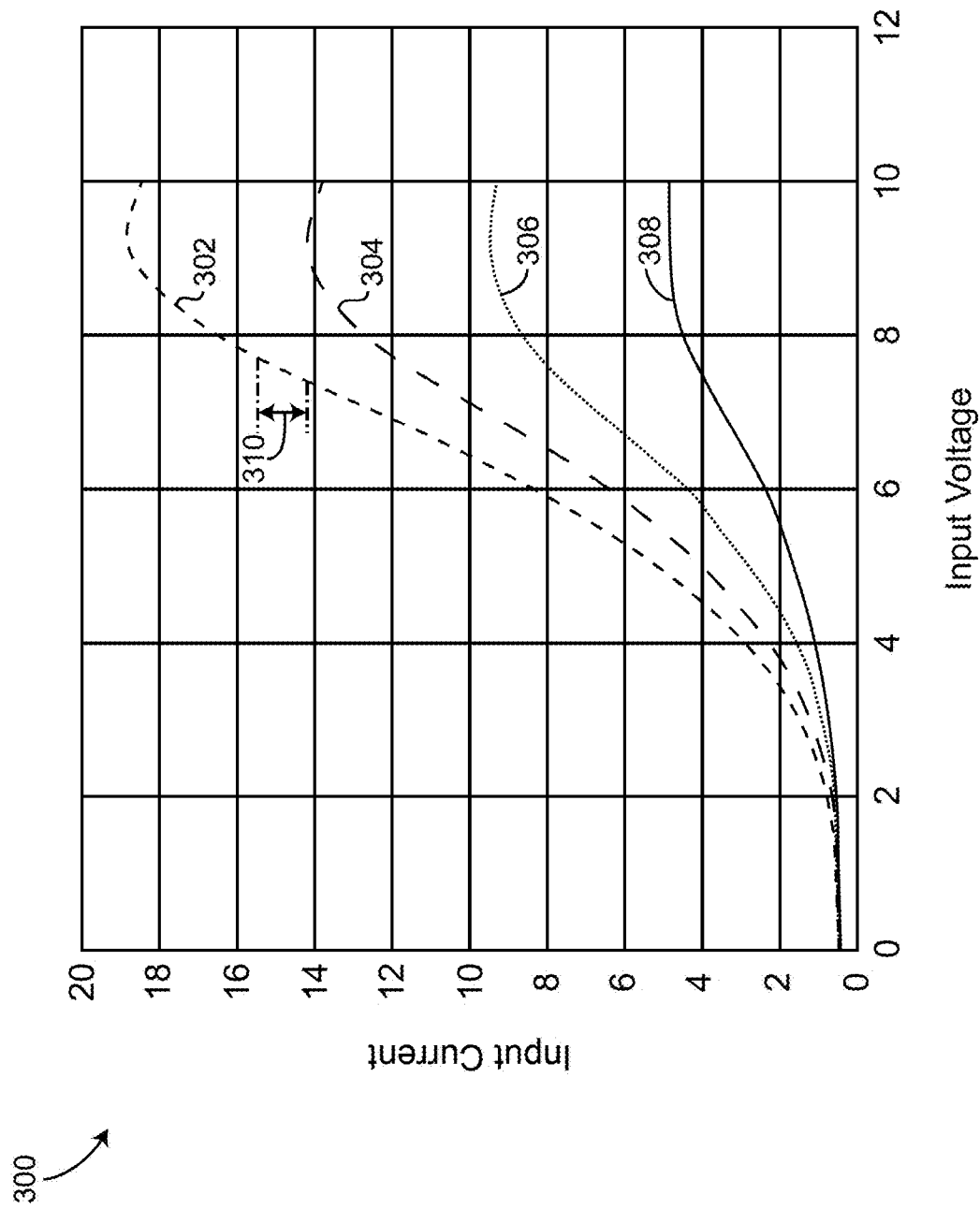
FIG. 3 is a graph illustrating input current versus input voltage for various numbers of operational fans of a condenser of the CO2 refrigeration system of FIG. 1, according to some embodiments.

Referring particularly to FIG. 3, a graph 300 showing input current (the Y-axis) of fans 30 versus input voltage (the X-axis) of fans 30 includes curve 302, curve 304, curve 306, and curve 308. Curves 302-308 demonstrate the relationship between the input current $I_{in}$ with respect to the input voltage $V_n$ of fans 30 for condenser 2. As shown in FIG. 3, curves 302-308 can have a sixth order polynomial shape. In some embodiments, curves 302-308 are represented or expressed with the equation:

$$a_1 V_{in}^6 + a_2 V_{in}^5 + a_3 V_{in}^4 + a_4 V_{in}^3 + a_5 V_{in}^2 + a_6 V_{in} + a_7 = I_{in}$$

where $a_1, a_2, \ldots, a_7$ are various parameters, $I_{in}$ is the input current of fans 30 (e.g., the Y-axis value) and $V_n$ is the input voltage of fans 30 (e.g., the X-axis value). It should be understood that each of curves 302-308 may have different values of parameters $a_1, a_2, a_7$. Curves 302-308 may have a sixth order polynomial shape due to the relationship between input voltage fan speed co (e.g., speed of fans 30), and input current $I_{in}$.

Graph 300 shows various curves for a condenser 2 with four fans 30. Curve 302 illustrates the input current $I_{in}$ as a function of the input voltage $V_n$ when all of the four fans 30 are operating properly. Curve 304 illustrates the input current $I_{in}$ as a function of the input voltage $V_{in}$ when one of the fans 30 is not operating properly (e.g., when three of the four fans 30 are operating properly). Curve 306 illustrates the input current $I_{in}$ as a function of the input voltage $V_n$ when two of the fans 30 are not operating properly (e.g., when two of the four fans 30 are operating properly). Curve 308 illustrates the input current $I_{in}$ as a function of the input voltage $V_{in}$ when three of the fans 30 are not operating properly (e.g., when only one of the fans 30 are operating properly).

Curves 302-308 can be generated using empirical or experimental data. For example, controller 202 can be configured to monitor the input current $I_{in}$ and the input voltage $V_{in}$ of fans 30. Controller 202 can shut off various numbers of the fans 30 and collect input current and input voltage data. Controller 202 can perform a regression (e.g., a sixth order polynomial regression) to determine values of the parameters $a_1, a_2, a_7$ for each of curves 302-308. In other embodiments, curves 302-308 are preprogramed or stored in controller 202 and are used by controller 202 to identify a number $n_{fan,fail}$ of in-operational, failed, or faulty fans 30.

Referring still to FIG. 3, graph 300 is shown to include an offset amount, a delta amount, an uncertainty, etc., shown as tolerance 310. In some embodiments, tolerance 310 is a range of acceptable values of the input current $I_{in}$ for a corresponding input voltage $V_{in}$ value. Tolerance 310 may be a predetermined amount (e.g., +/−1 Amp), a percentage, a standard deviation, multiple standard deviations, a portion of a standard deviation, etc. In some embodiments, tolerance 310 is the same or uniform for all different values of the input voltage $V_{in}$. In other embodiments, tolerance 310 varies based on the value of the input voltage $V_{in}$. For example, tolerance 310 can be a function of the input voltage $V_{in}$. In some embodiments, tolerance 310 is the same for each of curves 302-308. In other embodiments, tolerance 310 is different based on curves 302-308. For example, tolerance 310 associated with curve 302 may be greater than or less than a tolerance 310 associated with another of curves 302-308.

Condenser Controller

Figure 4:
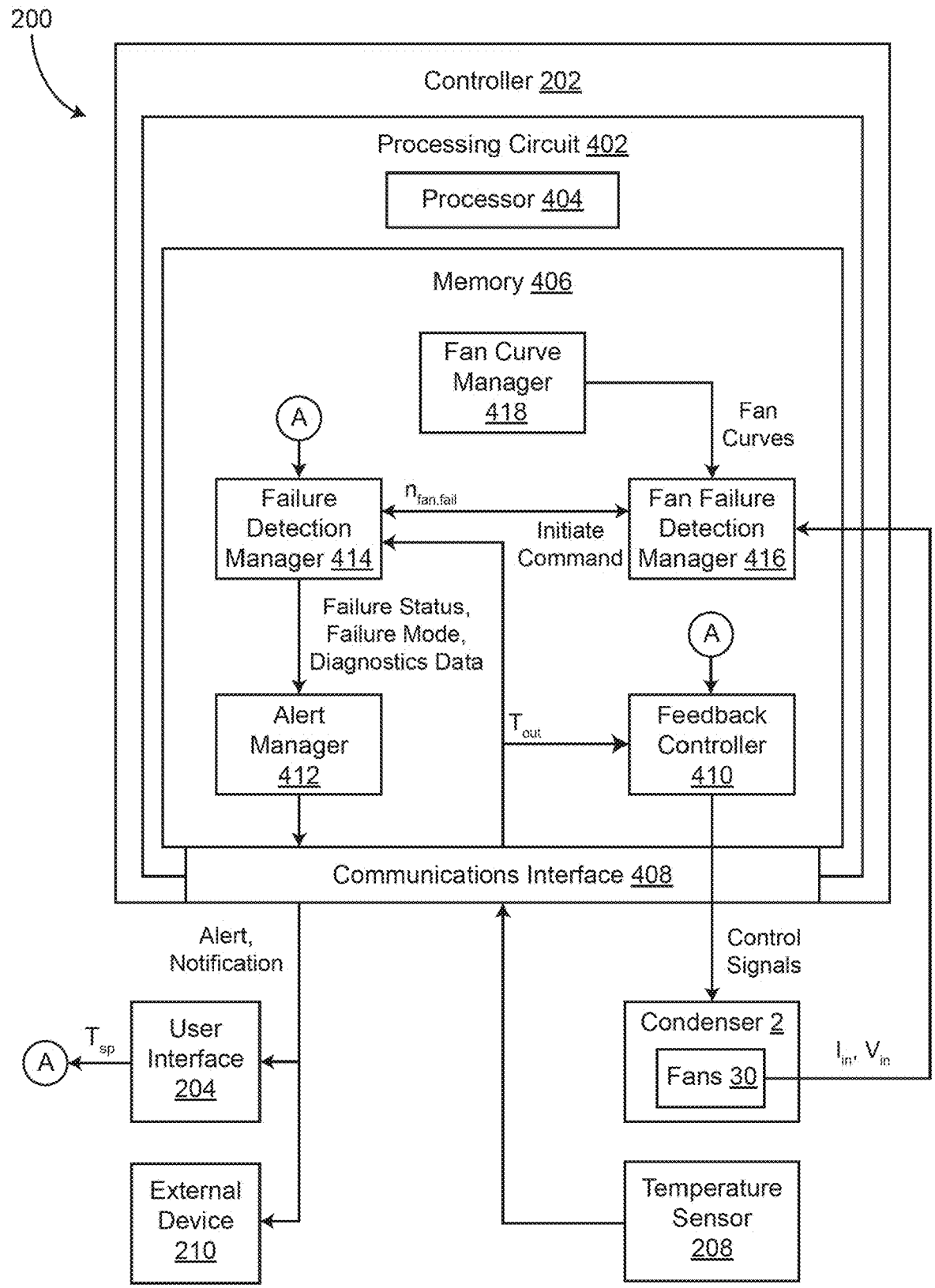
FIG. 4 is a block diagram of a portion of the diagnostics and control system of FIG. 2, according to some embodiments.

Referring particularly to FIG. 4, controller 202 is shown in greater detail, according to some embodiments. Controller 202 can be configured to operate condenser 2 (e.g., by operating fans 30) and can monitor condenser 2 for fault detection, to determine troubleshooting information, etc.

Controller 202 can include a communications interface 408. Communications interface 408 may facilitate communications between controller 202 and external systems, devices, sensors, etc. (e.g., user interface 204, external device 210, condenser 2, temperature sensor 208, a current sensor, a voltage sensor, etc.) for allowing user control, monitoring, and adjustment to any of the communicably connected devices, sensors, systems, primary movers, etc.

Communications interface 408 may also facilitate communications between controller 202 and a human machine interface.

Communications interface 408 can be or include wired or wireless communications interfaces (e.g., jacks, antennas, transmitters, receivers, transceivers, wire terminals, etc.) for conducting data communications with sensors, devices, systems, etc., of control and diagnostics system 200 or other external systems or devices (e.g., a user interface, one or more components of CO2 refrigeration system 100, etc.). In various embodiments, communications via communications interface 408 can be direct (e.g., local wired or wireless communications) or via a communications network (e.g., a WAN, the Internet, a cellular network, etc.). For example, communications interface 408 can include an Ethernet card and port for sending and receiving data via an Ethernet-based communications link or network. In another example, communications interface 408 can include a Wi-Fi transceiver for communicating via a wireless communications network. In some embodiments, the communications interface is or includes a power line communications interface. In other embodiments, the communications interface is or includes an Ethernet interface, a USB interface, a serial communications interface, a parallel communications interface, etc.

Controller 202 includes a processing circuit 402, a processor 404, and memory 406, according to some embodiments. Processing circuit 402 can be communicably connected to communications interface 408 such that processing circuit 402 and the various components thereof can send and receive data via the communications interface. Processor 404 can be implemented as a general purpose processor, an application specific integrated circuit (ASIC), one or more field programmable gate arrays (FPGAs), a group of processing components, or other suitable electronic processing components.

Memory 406 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 406 can be or include volatile memory or non-volatile memory. Memory 406 can include database components, object code components, script components, or any other type of information structure for supporting the various activities and information structures described in the present application. According to some embodiments, memory 406 is communicably connected to processor 404 via processing circuit 402 and includes computer code for executing (e.g., by processing circuit 402 and/or processor 404) one or more processes described herein.

Referring still to FIG. 4, memory 406 is shown to include a feedback controller 410, an alert manager 412, a failure detection manager 414, a fan curve manager 418, and a fan failure detection manager 416, according to some embodiments. Feedback controller 410 is configured to operate condenser 2 according to a feedback control scheme, according to some embodiments. Failure detection manager 414 is configured to determine if condenser 2 is operating properly (e.g., whether or not condenser 2 has experienced any failures), according to some embodiments. Fan curve manager 418 is configured to store, generate, and/or provide fan curves, equations, etc., that controller 202 may use to identify a number of fault or in-operational fans 30, according to some embodiments. Fan failure detection manager 416 is configured to determine a number of fans 30 that are in-operational, according to some embodiments.

Referring still to FIG. 4, memory 406 is shown to include a feedback controller 410, according to some embodiments. In some embodiments, feedback controller 410 is configured to receive the outlet temperature $T_{out}$ of the condensed and/or cooled CO2 in fluid conduit 3. Feedback controller 410 can also receive, retrieve, use, store, etc., the setpoint temperature $T_{sp}$. In some embodiments, as shown in FIG. 4, feedback controller 410 receives the setpoint temperature $T_{sp}$ from user interface 204. In other embodiments, feedback controller 410 uses a predetermined or predefined value of the setpoint temperature $T_{sp}$. For example, feedback controller 410 can select, determine, or use a value of the setpoint temperature $T_{sp}$ according to a control scheme or a control program.

Feedback controller 410 can be configured to perform a feedback control scheme, a feedback control program, etc., to operate condenser 2. For example, feedback controller 410 may use a PI control scheme, a PID control scheme, etc. In some embodiments, feedback controller 410 uses a closed-loop feedback control scheme. The setpoint temperature $T_{sp}$ may be the target value, and the outlet temperature $T_{out}$ can be the variable that feedback controller 410 operates to drive towards the target value. Feedback controller 410 can affect the outlet temperature $T_{out}$ by generating control signals for condenser 2 (e.g., control signals for fans 30). Feedback controller 410 can receive values of the outlet temperature $T_{out}$ from temperature sensor 208 in real-time and may use the values of the outlet temperature $T_{out}$ in the feedback control scheme to drive the outlet temperature $T_{out}$ towards the setpoint temperature $T_{sp}$.

Referring still to FIG. 4, failure detection manager 414 is configured to receive the outlet temperature $T_{out}$ from temperature sensor 208, according to some embodiments. In some embodiments, failure detection manager 414 is configured to compare the outlet temperature $T_{out}$ to the setpoint temperature $T_{sp}$ to determine if condenser 2 is operating properly. In some embodiments, failure detection manager 414 is configured to determine a difference between the outlet temperature $T_{out}$ and the setpoint temperature $T_{sp}$:

$$\Delta T = |T_{out} - T_{sp}|$$

where $\Delta T$ is the difference between the outlet temperature $T_{out}$ and the setpoint temperature $T_{sp}$. Failure detection manager 414 can compare the difference $\Delta T$ to a corresponding threshold value $\Delta T_{threshold}$ to determine if condenser 2 is operating properly. In some embodiments, if the difference $\Delta T$ exceeds the threshold value $\Delta T_{threshold}$, failure detection manager 414 determines that condenser 2 is not operating properly. In some embodiments, failure detection manager 414 determines that condenser 2 is not operating properly in response to the difference $\Delta T$ exceeding the threshold value $\Delta T_{threshold}$ for a predetermined amount of time or a predetermined time duration. For example, once condenser 2 is operating in steady state, failure detection manager 414 can monitor the outlet temperature $T_{out}$ over a time duration, and if the outlet temperature $T_{out}$ deviates (e.g., is greater than or less than) the setpoint temperature $T_{sp}$ by some amount (e.g., by the threshold $\Delta T_{threshold}$) for at least the time duration, failure detection manager 414 determines that condenser 2 is not operating properly.

Failure detection manager 414 can notify fan failure detection manager 416 that condenser 2 is not operating properly. In some embodiments, failure detection manager 414 provides an initiation command to fan failure detection manager 416 in response to determining that condenser 2 is not operating properly so that fan failure detection manager 416 initiates and performs its respective operations. Fan failure detection manager 416 can be configured to perform its respective operations to determine the number $n_{fan,fail}$ of fans 30 that have failed. Fan failure detection manager 416 may provide the number $n_{fan,fail}$ of fans 30 that have failed to failure detection manager 414.

Referring still to FIG. 4, fan failure detection manager 416 is configured to receive the initiation command from failure detection manager 414 and initiate its respective functions to determine if any of fans 30 have failed and/or how many of fans 30 have failed. The number of failed or in-operational fans 30 can be referred to as $n_{fan,fail}$. Fan failure detection manager 416 is configured to use fan curves (e.g., curves 302-308) as provided by fan curve manager 418 to determine the number $n_{fan,fail}$ of fans 30 that have failed. Fan failure detection manager 416 may retrieve the fan curves from fan curve manager 418 upon initiation. In some embodiments, fan curve manager 418 is configured to store or generate the fan curves. The fan curves can be the same as or similar to curves 302-308 as described in greater detail above with reference to FIG. 3. Specifically, the fan curves can express an expected input current $I_{in}$ of fans 30 given a particular input voltage $V_{in}$ for various values of $n_{fan,fail}$. For example, if condenser 2 includes four fans 30, fan failure detection manager 416 can retrieve a first curve that illustrates the expected or predicted input current $I_{in}$ as a function of input voltage $V_{in}$ when all four fans 30 are operating properly, a second curve that illustrates the expected or predicted input current $I_{in}$ as a function of input voltage $V_{in}$ when only three of the four fans 30 are operating properly, a third curve that illustrates the expected or predicted input current $I_{in}$ as a function of input voltage $V_{in}$ when only two fans 30 are operating properly, a fourth curve that illustrates the expected or predicted input current $I_{in}$ as a function of input voltage $V_{in}$ when only one of the four fans 30 is operating properly, and a fifth curve that illustrates the expected or predicted input current $I_{in}$ as a function of input voltage $V_{in}$ when none of the four fans 30 are operating properly.

The fan curves can be graphs, tabular data, mathematical equations, models, etc. For example, considering the case when four fans 30 are used, the first curve may define a non-faulty threshold value:

$$I_{threshold}=A_1V_{in}^6+A_2V_{in}^5+A_3V_{in}^4+A_4V_{in}^3+A_5V_{in}^2+A_6V_{in}+A_7$$

where $I_{threshold}$ is a non-faulty threshold value, $V_{in}$ is actual input voltage to fans 30 of condenser 2, and $A_1, A_2, \ldots, A_7$ are various coefficients/parameters.

Table 1 below shows possible values of the coefficients/parameters of curve 302 (e.g., the curve that represents or illustrates the non-faulty threshold):

TABLE 1

| Four Fan Sixth Order Polynomial Variables | |
|---|---|
| Variable | Value |
| $A_1$ | 0.0002 |
| $A_2$ | -0.0062 |
| $A_3$ | 0.0702 |
| $A_4$ | -0.3057 |
| $A_5$ | 0.7280 |
| $A_6$ | -0.5031 |
| $A_7$ | 0.4095 |

The second curve can define a first faulty threshold value:

$$I_{threshold,1}=B_1V_{in}^6+B_2V_{in}^5+B_3V_{in}^4+B_4V_{in}^3+B_5V_{in}^2+B_6V_{in}+B_7$$

where $I_{threshold,1}$ is a first faulty threshold value, $V_{in}$ is actual input voltage to fans 30 of condenser 2, and $B_1, B_2, \ldots, B_7$ are various coefficients/parameters.

Table 2 below shows possible values of the coefficients/parameters of curve 304 (e.g., the curve that represents or illustrates the first faulty threshold):

TABLE 2

| Three Fan Sixth Order Polynomial Variables | |
|---|---|
| Variable | Value |
| $B_1$ | 0.0002 |
| $B_2$ | -0.0077 |
| $B_3$ | 0.0851 |
| $B_4$ | -0.3843 |
| $B_5$ | 0.8722 |
| $B_6$ | -0.6109 |
| $B_7$ | 0.4142 |

The third curve can define a second faulty threshold value:

$$I_{threshold,2}=C_1V_{in}^6+C_2V_{in}^5+C_3V_{in}^4+C_4V_{in}^3+C_5V_{in}^2+C_6V_{in}+C_7$$

where $I_{threshold,2}$ is a second faulty threshold value, $V_{in}$ is actual input voltage to fans 30 of condenser 2, and $C_1, C_2, \ldots, C_7$ are various coefficients/parameters.

Table 3 below shows possible values of the coefficients/parameters of curve 306 (e.g., the curve that represents or illustrates the second faulty threshold):

TABLE 3

| Two Fan Sixth Order Polynomial Variables | |
|---|---|
| Variable | Value |
| $C_1$ | 0.0002 |
| $C_2$ | -0.0069 |
| $C_3$ | 0.0748 |
| $C_4$ | -0.3368 |
| $C_5$ | 0.7382 |
| $C_6$ | -0.5292 |
| $C_7$ | 0.4422 |

The fourth curve can define a third faulty threshold value:

$$I_{threshold,3}=D_1V_{in}^6+D_2V_{in}^5+D_3V_{in}^4+D_4V_{in}^3+D_5V_{in}^2+D_6V_{in}+D_7$$

where $I_{threshold,3}$ is a third faulty threshold value, $V_{in}$ is actual input voltage to fans 30 of condenser 2, and $D_1, D_2, \ldots, D_7$ are various coefficients/parameters.

Table 4 below shows possible values of the coefficients/parameters of curve 306 (e.g., the curve that represents or illustrates the third faulty threshold):

TABLE 4

| One Fan Sixth Order Polynomial Variables | |
|---|---|
| Variable | Value |
| $D_1$ | 0.0001 |
| $D_2$ | -0.0038 |
| $D_3$ | 0.0411 |
| $D_4$ | -0.1826 |
| $D_5$ | 0.3809 |
| $D_6$ | -0.2503 |
| $D_7$ | 0.4082 |

The fifth curve can define a fourth faulty threshold value:

$$I_{threshold,4}=E_1V_{in}^6+E_2V_{in}^5+E_3V_{in}^4+E_4V_{in}^3+E_5V_{in}^2+E_6V_{in}+E_7$$

where $I_{threshold,4}$ is a fourth faulty threshold value, $V_{in}$ is actual input voltage to fans 30 of condenser 2, and $E_1$, $E_2$, . . . , $E_7$ are various coefficients/parameters.

Fan failure detection manager 416 may calculate the non-faulty threshold value $I_{threshold}$ and the faulty threshold values $I_{threshold,1}$, . . . , $I_{threshold,4}$ by inputting a measured or current voltage $V_{in}$ to the equations shown above. Fan failure detection manager 416 can receive the measured or current voltage $V_{in}$ that is currently provided to fans 30 from condenser 2 (e.g., from a voltage reader, a voltage sensor, etc.).

Fan failure detection manager 416 can also receive a value of the input current $I_{in}$ that is provided to fans 30 from condenser 2. In some embodiments, fan failure detection manager 416 receives the value of the input current $I_{in}$ from a current sensor at condenser 2.

Fan failure detection manager 416 can compare the value of the input current $I_{in}$ that is currently provided to fans 30 to the non-faulty threshold value $I_{threshold}$ and to each of the faulty threshold values $I_{threshold,1}$, . . . , $I_{threshold,4}$ to determine a number of fans 30 that have failed. Fan failure detection manager 416 may first determine a range of values for each of the non-faulty threshold values and the faulty threshold values.

For example, fan failure detection manager 416 can determine a non-faulty range $I_{range}$ of current values associated with the non-faulty threshold value $I_{threshold}$:

$$I_{range}=I_{threshold}\pm I_{tolerance}$$

where:

$$I_{range,min}\leq I_{range}\leq I_{range,max}$$

and:

$$I_{range,min}=I_{threshold}-I_{tolerance}$$

$$I_{range,max}=I_{threshold}+I_{tolerance}$$

according to some embodiments. The tolerance or delta $I_{tolerance}$ may be the same as or similar to tolerance 310 (shown in FIG. 3 above) or may be half of tolerance 310.

Fan failure detection manager 416 can also determine a first faulty range $I_{range,1}$ of current values associated with the first faulty threshold value $I_{threshold,1}$:

$$I_{range,1}=I_{threshold,1}\pm I_{tolerance}$$

where:

$$I_{range,1,min}\leq I_{range,1}\leq I_{range,1,max}$$

and:

$$I_{range,1,min}=I_{threshold,1}-I_{tolerance}$$

$$I_{range,1,max}=I_{threshold,1}+I_{tolerance}$$

according to some embodiments.

Fan failure detection manager 416 can also determine a second faulty range $I_{range,2}$ of current values associated with the second faulty threshold value $I_{threshold,2}$:

$$I_{range,2}=I_{threshold,2}\pm I_{tolerance}$$

where:

$$I_{range,2,min}\leq I_{range,2}\leq I_{range,2,max}$$

and:

$$I_{range,2,min}=I_{threshold,2}-I_{tolerance}$$

$$I_{range,2,max}=I_{threshold,2}+I_{tolerance}$$

according to some embodiments.

Fan failure detection manager 416 can also determine a third faulty range $I_{range,3}$ of current values associated with the third faulty threshold value $I_{threshold,3}$:

$$I_{range,3}=I_{threshold,3}\pm I_{tolerance}$$

where:

$$I_{range,3,min}\leq I_{range,3}\leq I_{range,3,max}$$

and:

$$I_{range,3,min}=I_{threshold,3}-I_{tolerance}$$

$$I_{range,3,max}=I_{threshold,3}+I_{tolerance}$$

according to some embodiments.

Fan failure detection manager 416 can also determine a fourth faulty range $I_{range,4}$ of current values associated with the fourth faulty threshold value $I_{threshold,4}$:

$$I_{range,4}=I_{threshold,4}\pm I_{tolerance}$$

where:

$$I_{range,4,min}\leq I_{range,4}\leq I_{range,4,max}$$

and:

$$I_{range,4,min}=I_{threshold,4}-I_{tolerance}$$

$$I_{range,4,max}=I_{threshold,4}+I_{tolerance}$$

according to some embodiments.

Fan failure detection manager 416 may compare the value of the input current $I_{in}$ to the non-faulty range $I_{range}$, and each of the faulty ranges $I_{range,1}$, . . . , $I_{range,4}$ to determine if any of fans 30 have failed and/or to determine a number of fans 30 that have failed. If the input current $I_{in}$ is within the non-faulty range $I_{range}$ (e.g., $I_{range,min}\leq I_{in}\leq I_{range,max}$), fan failure detection manager 416 may determine that none of fans 30 have failed (e.g., that all of fans 30 are operating properly). If the input current $I_{in}$ is outside of the non-faulty range $I_{range}$ (e.g., $I_{in}>I_{range,max}$ or $I_{in}<I_{range,min}$), fan failure detection manager 416 may determine that one or more of fans 30 have failed.

If the input current $I_{in}$ is within the first faulty range $I_{range,1}$ (e.g., $I_{range,1,min}\leq I_{in}\leq I_{range,1,max}$), fan failure detection manager 416 may determine that one of fans 30 have failed or are in-operational. If the input current $I_{in}$ is outside of the first faulty range $I_{range,1}$ (e.g., $I_{in}<I_{range,1,min}$), fan failure detection manager 416 may determine that two or more of fans 30 have failed or are in-operational.

If the input current $I_{in}$ is within the second faulty range $I_{range}$ (e.g., $I_{range,2,min}\leq I_{in}\leq I_{range,2,max}$), fan failure detection manager 416 can determine that two of fans 30 have failed or are in-operational. If the input current $I_{in}$ is outside of the second faulty range $I_{range,2}$ (e.g., $I_{in}<I_{range,2,min}$), fan failure detection manager 416 may determine that three of more of fans 30 have failed or are in-operational.

If the input current $I_{in}$ is within the third faulty range $I_{range,3}$ (e.g., $I_{range,3,min}\leq I_{in}\leq I_{range,3,max}$), fan failure detection manager 416 can determine that three of fans 30 have failed or are in-operational. If the input current $I_{in}$ is outside of the third faulty range $I_{range,3}$ (e.g., $I_{in}<I_{range,3,min}$), fan failure detection manager 416 can determine that four or more of fans 30 have failed or are in-operational.

If the input current $I_{in}$ is within the fourth faulty range $I_{range,4}$ (e.g., $I_{range,4,min} \leq I_{in} \leq I_{range,4,max}$), fan failure detection manager 416 can determine that all four of fans 30 have failed or are in-operational. In this way, fan failure detection manager 416 can determine a number of fans 30 that have failed or are in-operational. In some embodiments, fan failure detection manager 416 uses the logical conditions shown below:

| If: | Then: |
|---|---|
| $I_{range,min} \leq I_{in} \leq I_{range,max}$ | $n_{fan,fail} = 0$ |
| $I_{range,1,min} \leq I_{in} \leq I_{range,1,max}$ | $n_{fan,fail} = 1$ |
| $I_{range,2,min} \leq I_{in} \leq I_{range,2,max}$ | $n_{fan,fail} = 2$ |
| $I_{range,3,min} \leq I_{in} \leq I_{range,3,max}$ | $n_{fan,fail} = 3$ |
| $I_{range,4,min} \leq I_{in} \leq I_{range,4,max}$ | $n_{fan,fail} = 4$ |
| ... | ... |
| $I_{range,n,min} \leq I_{in} \leq I_{range,n,max}$ | $n_{fan,fail} = n$ |

$I_{range,n,min} \leq I_{in} \leq I_{range,n,max}$ $n_{fan,fail} = n$
where $n_{fan,fail}$ is the number of failed fans 30, and n is the total number of fans 30. As shown above, the number of faulty ranges is equal to the number of fans 30 at condenser 2. It should be understood that while the example shown and described herein includes four fans 30, condenser 2 can include any n number of fans 30.

Fan failure detection manager 416 can determine the number $n_{fan,fail}$ of failed fans 30 and provide failure detection manager 414 with the number $n_{fan,fail}$ of failed fans 30. Failure detection manager 414 may define a binary decision variable b that indicates whether or not condenser 2 is operating properly. If condenser 2 is not operating properly (as described in greater detail above), the binary decision variable may have a value of 1 (e.g., b=1). If condenser 2 is operating properly, the binary decision variable may have a value of 0 (e.g., b=0). The binary decision variable b can indicate a failure status of condenser 2 (e.g., indicating whether or not condenser 2 is operating properly). In some embodiments, failure detection manager 414 can determine a cause or a failure mode of condenser 2. For example, failure detection manager 414 can identify that condenser 2 has failed at least electrically (and possibly also mechanically) if $n_{fan,fail}>0$. If $n_{fan,fail}=0$ and b=1, failure detection manager 414 may determine that condenser 2 has failed mechanically but not electrically. Failure detection manager 414 can also provide the number $n_{fan,fail}$ of failed fans 30 to alert manager 412 as diagnostics data.

Alert manager 412 can be configured to receive the failure status (e.g., the binary decision variable b), the failure mode (e.g., mechanical and/or electrical), and the diagnostics data (e.g., $n_{fan,fail}$) from failure detection manager 414. Alert manager 412 may be configured to use the failure status, the failure mode, and the diagnostics data to generate an alert, a notification, a report, a diagnostics report, etc., for user interface 204 and/or external device 210. Alert manager 412 can provide the alert, notification, diagnostics report, etc., to user interface 204 and/or external device 210. User interface 204 and/or external device 210 may display any of the alert, the notification, the diagnostics report, etc., to a technician, a user, an administrator, etc. For example, user interface 204 may provide a notification of whether or not condenser 2 is operating properly, whether condenser 2 has failed mechanically and/or electrically, and/or how many of fans 30 have failed or are in-operational. The notification may be a textual message. For example, the message may read "Elec Failure: One Fan Failed" or "Elec Failure: Two Fan Failed" or "Elec Failure: Three Fan Failed" or "Elec Failure: Four Fan Failed" or "Mec Failure: Condenser."

Condenser Process

Figure 7:
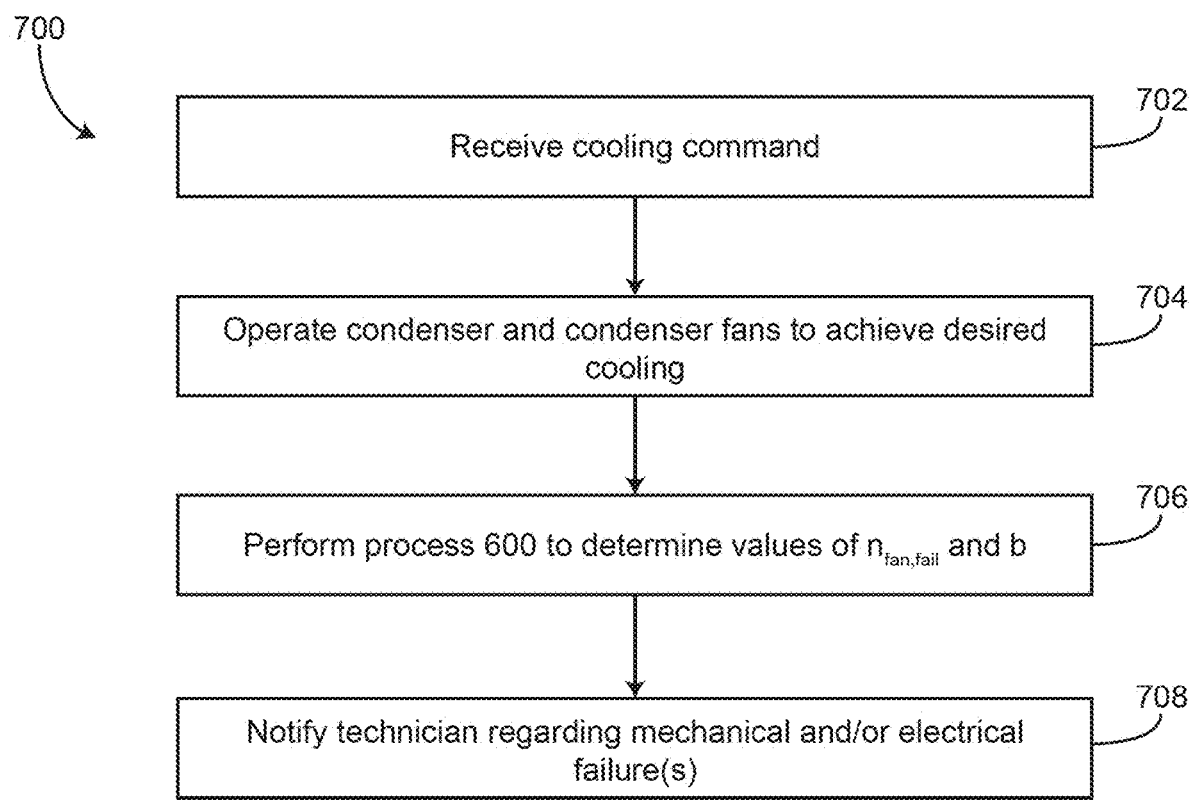
FIG. 7 is a flow diagram of a process for operating the condenser of the CO2 refrigeration system of FIG. 1, according to some embodiments.

Referring particularly to FIG. 7, a process 700 for operating condenser 2 is shown, according to some embodiments. In some embodiments, process 700 is performed by controller 202. Process 700 can include steps 702-708, according to some embodiments. Controller 202 can perform process 700 to operate condenser 2, fans 30, to achieve a desired cooling.

Process 700 includes receiving a cooling command (step 702), according to some embodiments. In some embodiments, the cooling command is a request to provide cooling to refrigeration rack 206. The cooling command can be a scheduled event, a user generated event, etc. For example, the cooling command can be periodically provided to controller 202 at scheduled intervals so that controller 202 operates condenser 2. Step 702 can be performed by controller 202.

Process 700 includes operating the condenser and the condenser fans (e.g., condenser 2 and fans 30) to achieve a desired cooling (step 704), according to some embodiments. In some embodiments, step 704 is performed by feedback controller 410. Feedback controller 410 may receive the temperature setpoint $T_{sp}$, the cooling command, the outlet condenser temperature $T_{out}$, etc., and use the temperature setpoint $T_{sp}$, the cooling command, the outlet condenser temperature $T_{out}$, etc., in a feedback control scheme to generate control signals for condenser 2 and/or fans 30.

Process 700 includes performing process 600 to determine values of the number $n_{fan,fail}$ and the decision variable b (step 706), according to some embodiments. In some embodiments, performing process 600 includes performing process 500 to determine the number $n_{fan,fail}$ of fans 30 that have failed or are in-operational. Step 706 can be performed by the various components of controller 202 as described in greater detail below with reference to FIGS. 5-6. Step 706 can also be performed to determine if condenser 2 is operating properly (e.g., to determine a value of the decision variable b). Step 706 can be performed to determine if condenser 2 has failed electrically and/or mechanically (e.g., to determine if fans 30 have failed or to determine if condenser 2 has failed).

Process 700 can include notifying a technician or a user regarding mechanical and/or electrical failure(s) (step 708), according to some embodiments. In some embodiments, step 708 is the same as or similar to steps 612 and 610 of process 600 as described in greater detail below with reference to FIG. 6. Steps 708 can be performed to notify the technician or the user regarding the failure mode, failure status, and troubleshooting information of condenser 2 and fans 30.

Overall Diagnostics Process

Figure 6:
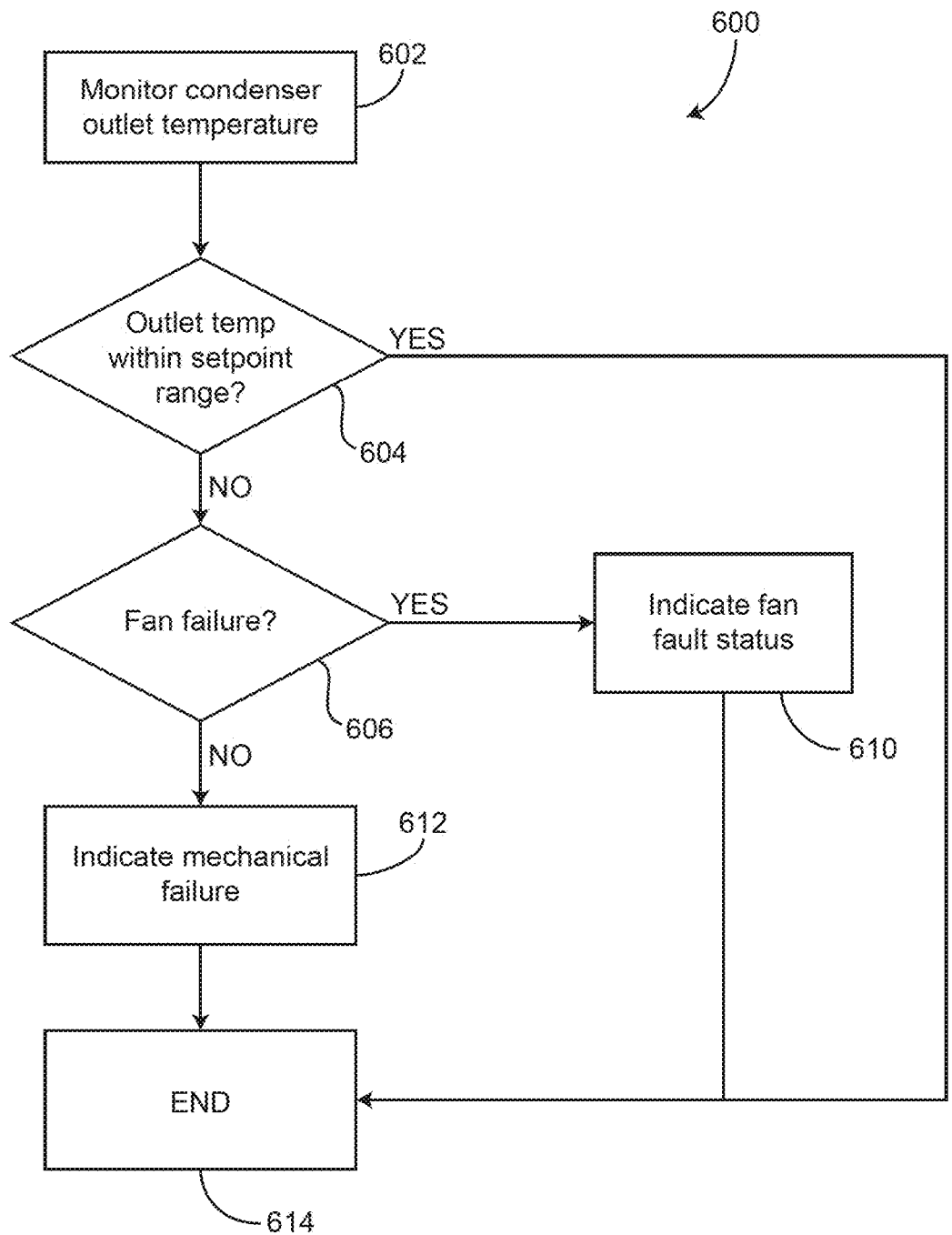
FIG. 6 is a flow diagram of a process for determining if the condenser of the CO2 refrigeration system of FIG. 1 has failed mechanically or electrically, according to some embodiments.

Referring particularly to FIG. 6, a process 600 for an overall diagnostics process of condenser 2 is shown, according to some embodiments. Process 600 includes steps 602-614, according to some embodiments. In some embodiments, process 600 is performed by controller 202. Process 600 can be performed by controller 202 to determine if any of fans 30 have failed, to determine if mechanical failure of condenser 2 has occurred, and to determine a number of fans 30 that have failed or are in-operational.

Process 600 include monitoring condenser outlet temperature (step 602), according to some embodiments. In some embodiments, step 602 includes receiving values of $T_{out}$ from temperature sensor 208. Step 602 can include receiving values of $T_{out}$ in real-time, or periodically. In some embodiments, the values of $T_{out}$ are received over a time duration. The values of $T_{out}$ can be averaged over the time duration. In some embodiments, step 602 is performed by failure detection manager 414.

Process 600 includes determining if the outlet temperature $T_{out}$ is within a setpoint range (step 604), according to some embodiments. In some embodiments, the setpoint range is a range of acceptable or allowable values of the outlet temperature $T_{out}$ that indicate that condenser 2 is operating properly. For example, the setpoint range can include a minimum allowable value $T_{min}$ and a maximum allowable value $T_{max}$. Step 604 can include comparing the outlet temperature $T_{out}$ to the minimum allowable value $T_{min}$ and the maximum allowable value $T_{max}$. In some embodiments, step 604 includes calculating a difference or a delta $\Delta T=|T_{out}-T_{sp}|$ where $T_{sp}$ is the setpoint temperature or an expected outlet temperature of condenser 2. In some embodiments, step 604 includes determining if the difference or the delta $\Delta T$ is greater than a corresponding threshold value $\Delta T_{threshold}$. In some embodiments, step 604 includes checking if the difference $\Delta T$ exceeds the threshold value $\Delta T_{threshold}$ for at least a predetermined amount of time (e.g., a predetermined time duration). If the outlet temperature $T_{out}$ is outside of the setpoint range (e.g., if the difference $\Delta T$ is greater than the threshold value $\Delta T_{threshold}$ for at least the time duration) (step 604, "YES"), process 600 may proceed to step 614, according to some embodiments. If the outlet temperature is within the setpoint range (step 604, "NO"), process 600 proceeds to step 606, according to some embodiments. In some embodiments, step 604 is performed by failure detection manager 414.

Process 600 includes determining if any fans 30 have failed, and/or determining the number $n_{fan,fail}$ of fans 30 that have failed (step 606), according to some embodiments. In some embodiments, step 606 is performed in response to step 604 (e.g., in response to "YES" or "NO" at step 604). Step 606 can include performing process 500 (as described in greater detail below with reference to FIG. 5) to identify whether or not any of fans 30 have failed and/or to determine the number $n_{fan,fail}$ of fans 30 that have failed. Step 606 can be performed by fan failure detection manager 416 using fan curves received from fan curve manager 418. In response to determining that one or more of fans 30 have failed (e.g., step 606, "YES"), process 600 proceeds to step 610, according to some embodiments.

Process 600 includes indicating a fan fault status (step 610), according to some embodiments. In some embodiments, step 610 is performed to notify, indicate, alert, etc., a technician, a user, etc., that one or more of fans 30 have failed. Step 610 can be performed by alert manager 412 and/or failure detection manager 414. Step 610 can include providing an alert, a notification, a message, etc., to user interface 204 and/or external device 210. In some embodiments, step 610 includes notifying the technician or user that one or more of fans 30 have failed. In some embodiments, step 610 includes notifying the technician or user regarding the number of fans 30 that have failed or are in-operational. For example, alert manager 412 may operate user interface 204 and/or external device 210 to display the number $n_{fan,fail}$ of failed fans 30 as determined in step 606 (e.g., as determined by performing process 500).

Process 600 includes indicating mechanical failure (step 612), according to some embodiments. In some embodiments, step 612 is determined in response to determining that the outlet temperature $T_{out}$ is not within the setpoint range (step 604, "NO") and that none of fans 30 have failed (e.g., in response to $n_{fan,fail}=0$ or in response to step 606 "NO"). Step 612 can be performed by failure detection manager 414 and alert manager 412. For example, failure detection manager 414 may determine that mechanical failure has occurred if the outlet temperature $T_{out}$ is outside of the setpoint range (step 604, "NO") and if fan failure has not occurred (step 606, "NO"). Failure detection manager 414 may notify alert manager 412 that mechanical failure has occurred. Alert manager 412 can notify, alert, alarm, etc., a user or a technician that mechanical failure has occurred by operating user interface 204 and/or external device 210 to notify the technician.

Fan Failure Detection Process

Figure 5:
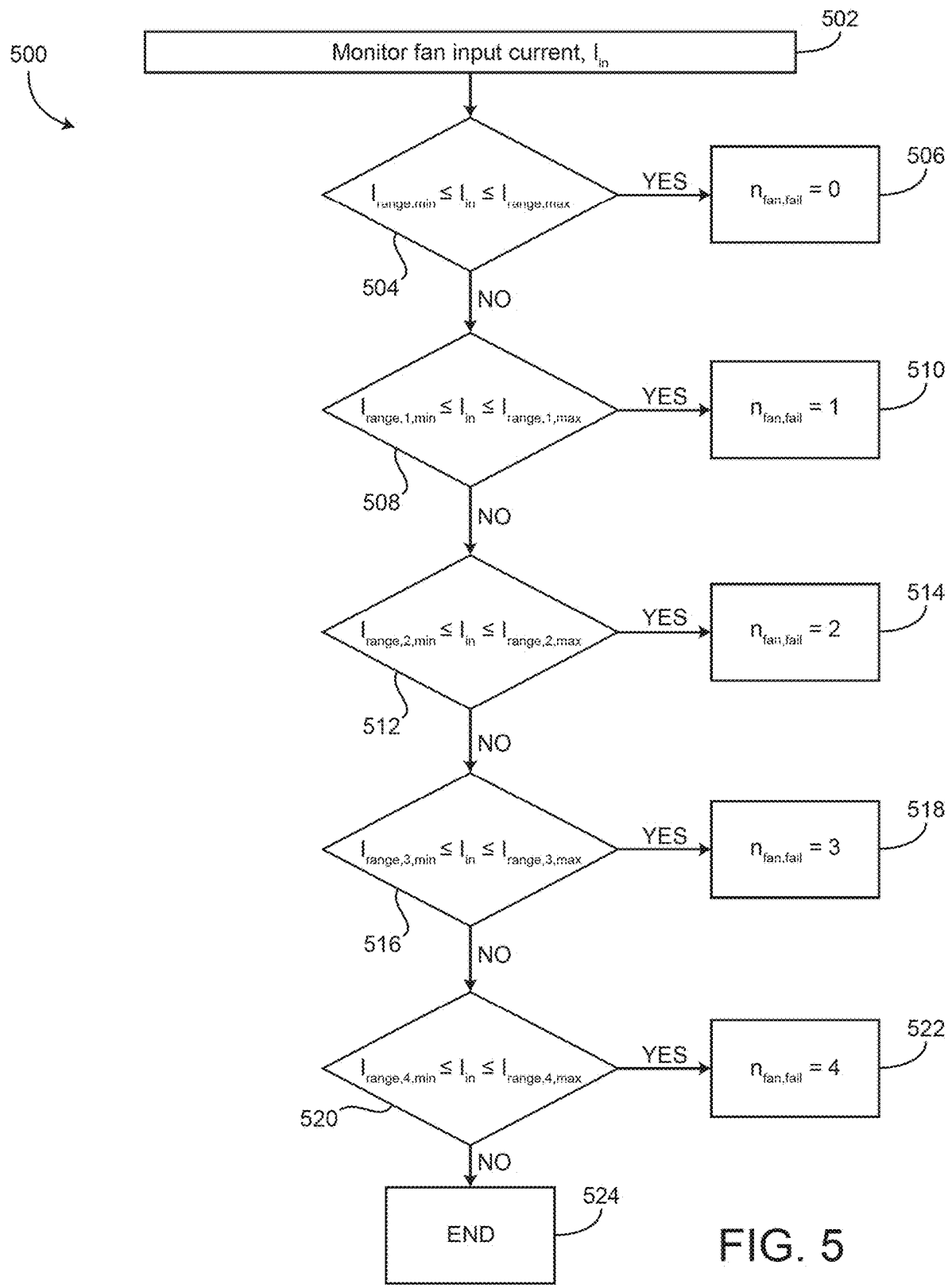
FIG. 5 is a flow diagram of a process for determining a number of in-operational or faulty fans of CO2 refrigeration system of FIG. 1, according to some embodiments.

Referring now to FIG. 5, a process 500 for detecting a number of failed fans in a condenser is shown, according to some embodiments. Process 500 includes steps 502-524 and can be performed by controller 202. In particular, process 500 may be performed by fan failure detection manager 416. Process 500 can be performed by fan failure detection manager 416 to determine a value of $n_{fan,fail}$. Process 500 can be performed in a diagnostics process to identify how many fans of the condenser have failed or are currently in-operational. It should be understood that while process 500 is shown and described for a condenser with four fans, process 500 can be easily performed to apply to condensers with more or less than four fans.

Process 500 includes monitoring a fan input current $I_{in}$ (step 502), according to some embodiments. In some embodiments, the fan input current $I_{in}$ is measured by a current sensor, a current probe, etc. In some embodiments, the fan input current $I_{in}$ is the current of electrical energy provided to fans 30. Step 502 can be performed by fan failure detection manager 416 of controller 202. Specifically, fan failure detection manager 416 may periodically receive values of the fan input current $I_{in}$ or may receive values of the fan input current $I_{in}$ in real-time.

Process 500 includes determining whether or not the fan input current $I_{in}$ is within a non-faulty range (step 504), according to some embodiments. In some embodiments, step 504 includes checking if the fan input current $I_{in}$ is greater or equal than a minimum current value $I_{range,min}$. Step 504 can also include checking if the fan input current $I_{in}$ is less than or equal to a maximum current value $I_{range,max}$. In some embodiments, step 504 includes checking if the condition: $I_{range,min} \leq I_{in} \leq I_{range,max}$ is true. The minimum current value $I_{range,min}$ and the maximum current value $I_{range,max}$ can be determined based on the non-faulty threshold value $I_{threshold}$ and the tolerance or delta value $I_{tolerance}$. The maximum current value $I_{range,max}$ can be also determined based on the non-faulty threshold value $I_{threshold}$ and the tolerance or delta value $I_{tolerance}$. The non-faulty threshold value $I_{threshold}$ may be predicted, estimated, etc., using a model, an equation, a mathematical representation of fans 30, a look-up table, a graph, a sixth order polynomial, etc., and the input voltage $V_{in}$ that is provided to fans 30. The input voltage $V_{in}$ can be measured at fans 30 by a voltage sensor. If the fan input current $I_{in}$ is within the non-faulty range, process 500 proceeds to step 506 (step 504, "YES"). If the fan input current $I_{in}$ is not within the non-faulty range, process 500 proceeds to step 508 (step 504, "NO"). In some embodiments, step 504 is performed by fan failure detection manager 416 using fan curves received or retrieved from fan curve manager 418.

Process 500 includes checking if the fan input current $I_{in}$ is within the first faulty range (i.e., checking if $I_{range,min} \leq I_{in} \leq I_{range,1,max}$ is true, step 508), checking if the fan input current $I_{in}$ is within the second faulty range (i.e., checking if $I_{range,2,min} \leq I_{in} \leq I_{range,2,max}$ is true, step 512), checking if the fan input current $I_{in}$ is within the third faulty range (i.e., checking if $I_{range,3,min} \leq I_{in} \leq I_{range,3,max}$ is true, step 516), and checking if the fan input current $I_{in}$ is within the fourth faulty range (i.e., checking if $I_{range,4,min} \leq I_{in} \leq I_{range,4,max}$ is true, step 520), according to some embodiments. In some embodiments, the number of faulty ranges that process 500 checks is equal to the number n of fans 30. In some embodiments, steps 508, 512, 516, and 520 are performed concurrently. In some embodiments, steps 508, 512, 516, and 520 are performed sequentially. Steps 508, 512, 516, and 520 can be performed by fan failure detection manager 416. If the fan input current $I_{in}$ is within the first faulty range (step 508, "YES"), the number of failed or in-operational fans is one (e.g., $n_{fan,fail}=1$) and process 500 proceeds to step 510, according to some embodiments. If the fan input current $I_{in}$ is within the second faulty range (step 512, "YES"), the number of failed or in-operational fans is two (e.g., $n_{fan,fail}=2$), and process 500 proceeds to step 514, according to some embodiments. If the fan input current $I_{in}$ is within the third faulty range (step 516, "YES"), the number of failed or in-operational fans is three (e.g., $n_{fan,fail}=3$), and process 500 proceeds to step 518, according to some embodiments. If the fan input current $I_{in}$ is within the fourth faulty range (step 520, "YES"), the number of failed or in-operational fans is four (e.g., $n_{fan,fail}=4$), and process 500 proceeds to step 522.

Process 500 includes determining that the number of failed or in-operational fans is one (e.g., $n_{fan,fail}=1$, step 510), determining that the number of failed or in-operational fans is two (e.g., $n_{fan,fail}=2$, step 514), determining that the number of failed or in-operational fans is three (e.g., $n_{fan,fail}=3$, step 518), and determining that the number of failed or in-operational fans is four (e.g., $n_{fan,fail}=4$, step 522), according to some embodiments. In some embodiments, step 510 is performed in response to step 508 (e.g., in response to "YES," step 508). In some embodiments, step 514 is performed in response to step 512 (e.g., in response to "YES," step 512). In some embodiments, step 518 is performed in response to step 516 (e.g., in response to "YES," step 516). In some embodiments, step 522 is performed in response to step 520 (e.g., in response to "YES," step 520). In some embodiments, steps 506, 510, 514, 518, and 522 are performed by fan failure detection manager 416. In this way, fan failure detection manager 416 can compare the fan input current $I_{in}$ to various faulty ranges to determine how many of fans 30 have failed or are in-operational.

Step 508 may be performed in response to step 504 (e.g., in response to "NO," step 504). Step 512 may be performed in response to step 508 (e.g., in response to "NO," step 508). Step 516 may be performed in response to step 512 (e.g., in response to "NO," step 512). Step 520 may be performed in response to step 516 (e.g., in response to "NO," step 516). In response to completing step 520, process 500 proceeds to step 524 and ends.

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "first", "second", "primary," "secondary," "above," "below," "between," etc.) are merely used to describe the orientation of various elements in the figures. It should be noted that the orientation of various elements may differ according to other exemplary embodiments, and that such variations are intended to be encompassed by the present disclosure.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. A CO2 refrigeration system comprising:
    a condenser configured to cool CO2;
    a plurality of fans configured to affect cooling operations of the condenser;
    a controller configured to:
        obtain a temperature value of CO2 output by the condenser;
        determine if the condenser is operating properly using the temperature value of the CO2;
        obtain values of input current and input voltage provided to the plurality of fans;
        determine a plurality of different current thresholds using a model that relates input current to input voltage, each of the plurality of different current thresholds corresponding to a number of in-operational or faulty fans of the plurality of fans; and determine a number of in-operational or faulty fans of the plurality of fans using the plurality of different current thresholds and values of the input current.

2. The system of claim 1, wherein the controller is configured to:
compare the temperature value of the CO2 to an expected value;
determine that the condenser is operating properly in response to the temperature value of the CO2 being substantially equal to the expected value; and
determine that the condenser is not operating properly in response to the temperature value of the CO2 deviating from the expected value by at least a threshold amount.

3. The system of claim 1, wherein the model is a plurality of sixth order polynomial curves, wherein:
a first one of the curves defines input current with respect to input voltage when all of the plurality of fans are operating properly; and
one or more of the curves define input current with respect to input voltage when one or more of the plurality of fans are not operating properly.

4. The system of claim 1, wherein the controller is configured to:
determine a first value of the input current using the value of the input voltage and the model, wherein the first value is a predicted value of the input current when all of the plurality of fans are operating properly;
determine a first range of values of the input current using the first value and a tolerance value;
determine that all of the fans are operating properly in response to the input current being within the first range of values; and
determine that one or more of the plurality of fans are not operating properly in response to the input current being outside of the first range of values.

5. The system of claim 4, wherein the controller is configured to:
determine one or more other values of the input current using the value of the input voltage and the model, wherein the other values of the input current each correspond to a different number of the plurality of fans operating properly;
determine one or more other ranges of values of the input current using the one or more other values of the input current and a tolerance value; and
determine a number of fans that are in-operational or faulty based on which of the other ranges of values the input current is within.

6. The system of claim 1, wherein the controller is configured to generate control signals for the fans to drive the temperature value of CO2 output by the condenser towards a setpoint temperature.

7. The system of claim 1, wherein the controller is configured to determine that the condenser has failed mechanically in response to:
determining that the condenser is not operating properly; and
determining that none of the plurality of fans are in-operational or faulty.

8. The system of claim 1, wherein the controller is configured to operate a user interface to notify a user regarding at least one of:
an operational status of the condenser;
an operational status of the plurality of fans; or
the number of in-operational or faulty fans.

9. A controller for operating and diagnosing a condenser, the controller configured to:
obtain an outlet temperature value of fluid output by the condenser;
compare the outlet temperature value of fluid to an expected outlet temperature value to determine an operational status of the condenser;
obtain an input current value and an input voltage value of electrical energy provided to a plurality of fans of the condenser;
estimate a plurality of ranges of current values using a model that relates input current to input voltage, each of the plurality of ranges corresponding to a number of in-operational or faulty fans of the plurality of fans;
determine a number of in-operational or faulty fans of the plurality of fans by determining which of the plurality of ranges the input current value is within; and
notify a user regarding the operational status of the condenser and the number of in-operational or faulty fans.

10. The controller of claim 9, wherein the controller is configured to:
determine that the condenser is operating properly in response to the outlet temperature value being substantially equal to the expected outlet temperature; and
determine that the condenser is not operating properly in response to the outlet temperature value deviating from the expected outlet temperature by at least a threshold amount.

11. The controller of claim 9, wherein the input current value being within a first range of current values of the plurality of ranges indicates that all of the plurality of fans are operating properly.

12. The controller of claim 11, wherein the first range is estimated using the model of the condenser that defines both a relationship between input current and input voltage for a case when all of the plurality of fans are operational, and a plurality of other cases when one or more of the plurality of fans are in-operational or faulty.

13. The controller of claim 12, wherein the controller is configured to:
predict a first value of the input current using the model for the case when all of the plurality of fans are operational;
determine the first range of values of the input current using the first value and a tolerance value;
predict a plurality of other values of the input current using the model for cases when different numbers of the plurality of fans are in-operational or faulty;
determine the plurality of ranges of values of the input current for cases when different numbers of the plurality of fans are in-operational or faulty; and
compare the input current value to the first range of values and each of the plurality of ranges of values of the input current to determine a number of the plurality of fans that are in-operational or faulty.

14. The controller of claim 9, wherein the controller is configured to generate control signals for the plurality of fans to drive the outlet temperature value of fluid towards a setpoint value.

15. The controller of claim 9, wherein the controller is configured to determine that the condenser is mechanically in-operational in response to:
determining that the condenser is not operating properly; and
determining that none of the plurality of fans are in-operational or faulty.

16. The controller of claim 15, wherein the controller is configured to operate a user interface to notify a user regarding at least one of:
the operational status of the condenser;
an operational status of the plurality of fans; or
the number of in-operational or faulty fans.

17. A method for controlling and diagnosing a condenser, the method comprising:
operating a plurality of condenser fans to drive an outlet fluid temperature of the condenser towards a setpoint value;
obtaining a value of the outlet fluid temperature of the condenser;
determining if the condenser is operating properly based on the value of the outlet fluid temperature of the condenser and the setpoint value;
obtaining values of input current and input voltage provided to the plurality of condenser fans;
determining a plurality of different current thresholds using one or more models that relate input current to input voltage, each of the plurality of different current thresholds corresponding to a number of in-operational or faulty fans of the plurality of fans; and
determining a number of in-operational or faulty condenser fans of the plurality of condenser fans using the plurality of different current thresholds and values of the input current.

18. The method of claim 17, wherein determining if the condenser is operating properly comprises:
comparing the outlet fluid temperature of the condenser to the setpoint value;
determining that the condenser is operating properly in response to the outlet fluid temperature of the condenser being substantially equal to the setpoint value; and
determining that the condenser is not operating properly in response to the outlet fluid temperature of the condenser deviating from the setpoint value by at least a threshold amount.

19. The method of claim 17, wherein determining the number of in-operational or faulty condenser fans comprises:
determining a first value of the input current using the value of the input voltage and the model, wherein the first value is a predicted value of the input current when all of the plurality of condenser fans are operating properly;
determining a first range of values of the input current using the first value and a tolerance value;
determining that all of the condenser fans are operating properly in response to the input current being within the first range of values; and
determining that one or more of the plurality of condenser fans are not operating properly in response to the input current being outside of the first range of value.

20. The method of claim 19, further comprising:
determining one or more other values of the input current using the value of the input voltage and the model, wherein the other values of the input current each correspond to a different number of the plurality of condenser fans operating properly;
determining one or more other ranges of values of the input current using the one or more other values of the input current and a tolerance value; and
determining a number of fans that are in-operational or faulty based on which of the other ranges of values the input current is within.

* * * * *